July 17, 1956 W. W. LOGAN 2,755,339

AUTOMATIC ELECTRIC-CIRCUIT SELECTOR SYSTEM

Filed Dec. 26, 1952 2 Sheets-Sheet 1

INVENTOR
William W. Logan
BY
George H. Fritzinger

INVENTOR
William W. Logan
BY George H. Fritzinger 2,755,339

AUTOMATIC ELECTRIC-CIRCUIT SELECTOR SYSTEM

William W. Logan, Glen Ridge, N. J., assignor to Thomas A. Edison, Incorporated, West Orange, N. J., a corporation of New Jersey Application December 26, 1952, Serial No. 327,974

14 Claims. (Cl. 179—18)

This invention relates to novel selector means in multistation electric-circuit systems for effecting independent connections automatically between stations of a first group and selected stations of a second group respectively upon the performance of operation-initiating control manipulations at the first stations.

The invention is adapted particularly for phonographic dictation-recording systems of the multistation type comprising a plurality of recording and reproducing machines with respective control apparatus, herein referred to as "attendants' stations," and a plurality of remote operators' stations, typically several times greater than the number of attendants' stations, each having typically a handset (with a microphone and receiver), manual controls and a signaling device. My invention is herein particularly described in connection with such phonographic system for purposes of illustration, but no unnecessary limitation of my invention to phonographic systems is intended.

Objects of my invention are to provide an improved automatic circuit selector means for multistation phonographic systems or the like, which will effect an independent connection between a remote calling station and an idle recording machine, if available, when the operator at the calling station picks up his handset; which will signal the calling operator and all idle remote stations if no machine is available; which is capable of effecting independent interstation connections without disturbing connections already made; which is adapted to make independent connections between remote and attendants' stations without ever causing either remote or attendants' stations to be parallel with each other; and which is adapted to enable the disabling of the automatic selector means as to selected stations, to enable portions of the selector means to be serviced and repaired, without influencing the operation of the selector means as to other stations or as to interstation connections already made.

A further object of my invention is to provide an improved circuit selector unit for fulfilling one or more of the aforestated objectives, which is wholly positive and reliable in its operation.

These and other objects and features of my invention will be apparent from the following description and the appended claims.

Figure 1:
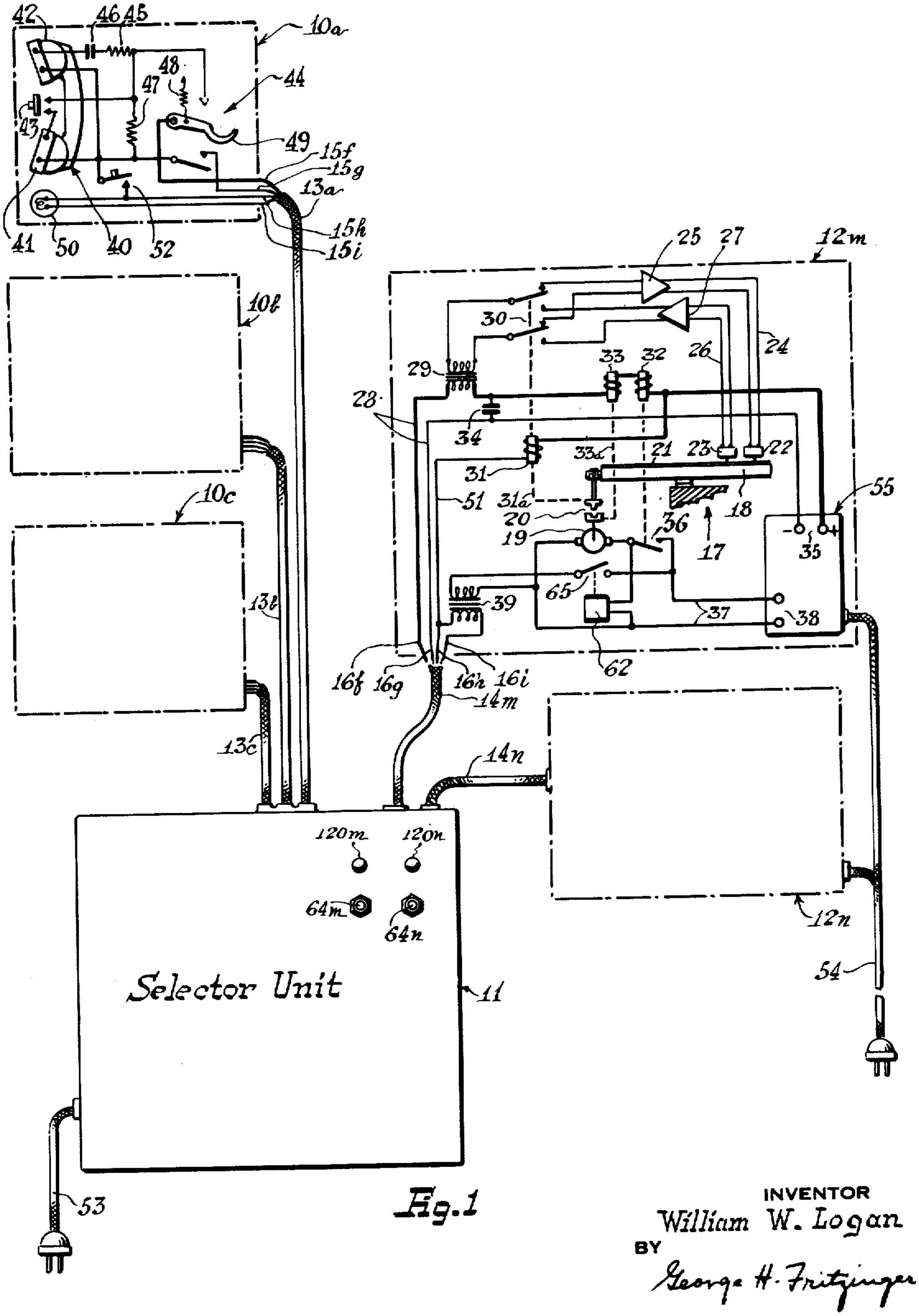
Figure 2:
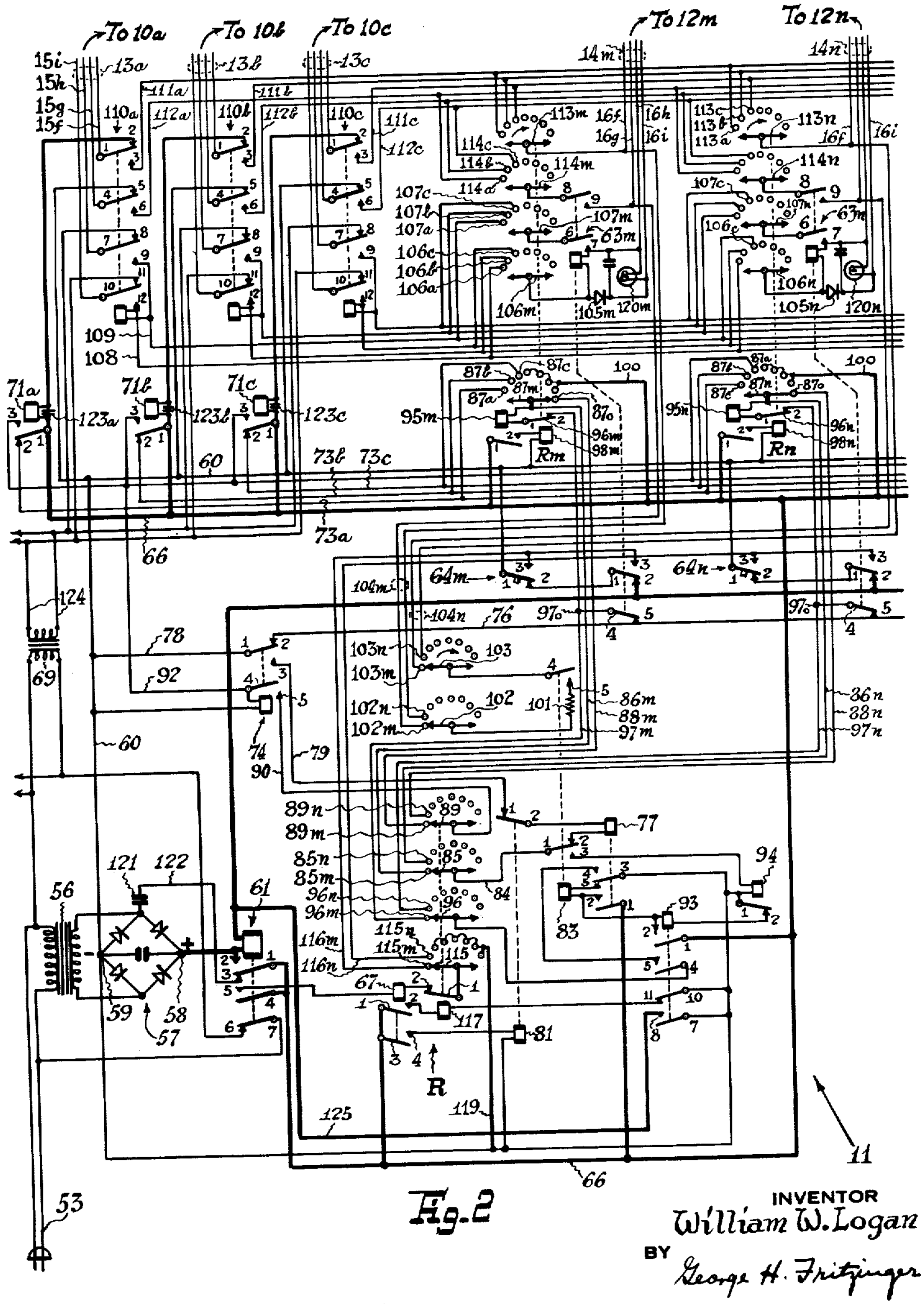

In the description of my invention reference is had to the accompanying drawings, of which:

Figure 1 is a diagrammatic view of a multistation phonographic system illustrating the apparatus for the stations of such system and the manner in which these stations are connected to an automatic selector unit of my invention; and Figure 2 is a schematic circuit diagram of the selector unit.

The present phonographic system comprises any suitable number of remote operators' stations which may be identical, any suitable number of attendants' stations respectively including recording and/or reproducing phonographic machines which likewise may be identical, and a selector unit for automatically interconnecting these stations.

The phonographic system herein shown, less the selector unit, is a simplified version of the type described and claimed in the pending Kobler application Serial No. 204,794, filed January 6, 1951, and Somers et al. application Serial No. 280,074, filed April 2, 1952, both of which have common ownership with the present application.

For purposes of illustration, three remote stations are shown diagrammatically and referred to as **10*a*, 10*b* and 10*c*, and two attendants' stations are shown diagrammatically and referred to as 12*m* and 12*n*; however, the apparatus of only the remote station 10*a* and the attendant's station 12*m* are shown. The selector unit, referred to as 11 and shown fully in Figure 2, operates to connect a remote operator's station automatically to an idle machine, if any, of one of the attendants' stations when an operator performs a suitable manipulation for initiating operation of the system from his station. As shown in Figure 1, each remote operator's station has a 4-lead cable connection to the selector unit referred to by the number 13 with the suffix letter of the respective station; and likewise each attendant's station has a 4-lead cable connection to the selector unit referred to by the number 14 with the suffix letter of the respective attendant's station. The leads of each of the cables 13 running from the remote stations are 15*f*, 15*g*, 15*h* and 15*i*, and the leads of each of the cables 14 running from the attendants' stations are 16*f*, 16*g*, 16*h* and 16*i***. As will more fully appear, the two leads with suffix letters *f* and *g* of each of the cables serve as part of a combined audio and control circuit, and the other two with suffix letters *h* and *i* serve as part of a signaling circuit. When a remote station is connected by the selector unit to one of the attendants' stations, the leads of the cable of that remote station are connected respectively to the leads of the cable of that attendant's station having the same suffix letters. My invention resides in the selector unit, but before describing that unit a description is given of the system operating as a phonograph, say between the stations **10*a* and 12*m***.

The phonographic machine at station **12*m*, referred to generally as 17, may comprise a turntable 18 driven by a motor 19 through a clutch 20. The turntable carries a record disc 21 engaged by a recording unit 22 and a reproducing unit 23. Audio speech-representing currents are fed to the recording unit through a circuit 24 serially including an aimplifier 25, and such currents are fed from the reproducing unit 23 through a circuit 26 serially including an amplifier 27**. Two amplifiers are herein shown only to simplify the description, it being understood that one amplifier with suitable switching may serve for both recording and reproducing purposes.

The phonographic machine 17 has an audio circuit 28 connected to the outgoing leads **16*f* and 16*g* of the cable 14*m*. This audio circuit serially includes the primary of an audio transformer 29, the secondary of which is connectable either to the recording circuit 24 or reproducing circuit 26 by a double-pole double-throw switch 30 constituting part of a relay 31. Since the audio circuit 28 is used also for controlling purposes, it includes two serially-connected relays 32 and 33. A condenser 34** bypasses the audio currents in the audio circuit past these relays.

The audio circuit 28 is energized from a low-voltage D.-C. power source derived from a power pack 55 at terminals marked + and − respectively. The relays 32 and 33 operate at different levels of direct current in the audio circuit established by control manipulations of the operators of the remote stations, as hereinafter more particularly described. The relay 32 has contacts 36 operated at a lower current level to close a power circuit 37 serially including the motor 19. This power circuit is energized from an A.-C. source derived at terminals 38 of the power pack 55. The second relay 33 operates at a higher level of direct current and includes an armature to close the clutch 20 as represented diagrammatically by the tie line 33*a*. These relays may of course perform still other control functions which need not however be herein described. For the present purposes, it will be understood that the motor 19 is started when the relay 32 is operated and the clutch 20 is engaged to start rotation of the turntable 18 when the relay 33 is operated. An energization of the audio circuit 28 at the lower current level from one of the remote stations, with a resultant starting of the motor 19 or other conditioning of the machine for immediate start-stop operation thereof, is herein considered as an activation of that machine for use from that station.

Connected across the power circuit 37 through the relay switch 36 is a delayed-release relay indicated diagrammatically and referred to as 62. This relay has a switch 65 in a circuit of a voltage stepdown transformer 39 connected directly to the power circuit 37 ahead of the switch 36. The secondary of the transformer 39 is connected to the leads 16*h* and 16*i* of the cable 14*m* to provide a source of signaling current leading from the station 12*m*. The time delay in the release of relay 62 is typically about 5 seconds and is provided to enable momentary interruption of the audio circuit at the remote station without starting operation of the selector unit and losing connection with the machine, as will appear. Thus, in about 5 seconds after the audio circuit of the phonographic machine is opened by return of the station switch 44 to "off" position, the signaling circuit leading from the station 12*m* becomes deenergized.

The remote operator's station 10*a* has a handset 40, for example, of the usual telephone variety including, as transducer elements, a carbon button microphone 41 and a receiver 42. The microphone is connectable across the cable leads 15*f* and 15*g* through a manual, normally-open switch 43 and a double-pole on-off station switch 44. (Since these cable leads of the respective remote stations can be connected by the selector unit across the audio circuit of any of the phonographic machines, they may respectively be considered as branch communication circuits.) Both sections of the station switch 44 are closed when the switch is in "on" position, and vice versa. The receiver unit 42 is connected in parallel with the microphone and switch 43, through a series resistor 45 and condenser 46. Also, paralleling the microphone and switch 43 is a resistor 47. When the station switch 44 is closed, direct current flows through the resistor 47 via the branch communication circuit represented by the leads 15*f* and 15*g* of the cable 13*a*. As will appear, when the station 10*a* has been connected to the station 12*m*, this direct current is obtained through the leads 16*f* and 16*g* of the cable 14*m* and the audio circuit 28 from the direct-current source 35. This current is at the lower level, causing operation of the activating relay 32. When the manual switch 43 is also closed, current flows through both the resistor 47 and the microphone 41 at the higher level, causing also relay 33 to operate. Since this latter relay controls the start-stop clutch 20, the manual switch 43 may be termed a "start-stop" control.

The station switch 44 is urged closed as by a spring 48, but one pole thereof has an extension 49, shown for example as being hook-shaped, to receive the handset 40 and support the same when the remote station is not in use. The weight of the handset is sufficient to overcome the spring 48 and hold the station switch open. In Figure 1, the station switch is shown in open position as though the handset were resting on the extension 49.

The remote station 10*a* has also a signal lamp 50 which is connected to the leads 15*h* and 15*i* of the cable 13*a*. Since the leads 15*h* and 15*i* of this cable are connected by the selector unit 12 to the leads 16*h* and 16*i* of the cable 14*m* constituting the signal circuit of the station 12*m*, the signal lamp 50 is lit whenever the station is connected to an activated machine.

The recorder and reproducer units 22 and 23 are mounted for traveling movement relative to the turntable 18, and may be lifted from and lowered onto the record either individually or in unison, but the mechanism for doing this need not be described for the purposes of the present invention. Preferably, in a remotely-controlled system as herein described, both units are normally engaged with the record, with the reproducer unit at a trailing distance from the recorder unit, since then one may listen back to the portion of one's recorded dictation between the two units upon merely shifting the circuit connections of these two units and resuming operation of the machine. For the purpose of playback as here mentioned, there is provided the relay 31. This relay has an energizing circuit leading from the positive terminal of the D.-C. source 35 through lead 51, cable leads 16*h* and 15*h* to the remote station, the normally-open manual switch 52 at the remote station, station switch 44, and cable leads 15*g* and 16*g* to the negative side of the D.-C. source 35. In order that the turntable may also be started as the switch 52 is closed, the relay 31 has an armature for operating the clutch 20 as represented by the tie line 31*a*. Thus, the switch 52 is a complete playback control for the machine.

The power supply at each attendant's station may be derived through a power cable 54 having branch connections to the respective attendants' stations as shown in Figure 1. At each attendant's station there is the power pack 55, diagrammatically shown. It will be understood that each of these power packs will typically include an on-off switch and suitable transformer and rectifying apparatus (not shown) for providing the D.-C. and A.-C. sources represented by the terminals 35 and 38.

For a detailed description of a remotely-controlled dictation-recording system of the character herein generally described, reference may be had to the aforementioned Somers et al. application Serial No. 280,074.

The selector unit 11 shown in Figure 2 serves to connect automatically a remote station to an idle machine, if available, when the handset at that remote station is picked up. In describing this selector unit, those components having specific functions for certain stations are given reference numbers with the suffix letter of the respective station, and those components having general functions are given reference numbers without suffix letters. However, in general reference to those components which have specific functions with respect to the different stations, they are referred to by their reference numbers only. It may first be noted that the selector unit comprises a 6-pole station or machine-selector stepping switch R which has as many positions as there are attendants' stations or machines, and has a 5-pole line-finder stepping switch for each attendant's station or machine, referred to by the letter R with the suffix letter of the respective attendant's station—there being for instance two such stepping switches $R_m$ and $R_n$ in the present instance—each of which has as many positions as there are remote stations plus a home position. By way of example, the stepping switch R has eight positions or contacts for each pole; however, only two of each set of contacts are active since only two attendants' stations are shown. Also, only by way of example, each of the stepping switches $R_m$ and $R_n$ has seven contacts for each pole for connection with the remote stations and additionally has an eighth contact for one of the poles utilized in controlling the stepping switch; however, only three of each set of seven contacts are active because only three remote stations are shown.

In the following description, the stepping switch R is called a "machine selector" R, and the stepping switches $R_m$, $R_n$, etc. are called "line finders" $R_m$, $R_n$, etc. This terminology is appropriate since, as will appear, the stepping switch R operates to select an idle machine before the machine is called for by an operator, and the stepping switches $R_m$, $R_n$, etc. operate for the machine last selected to find the station of the calling operator.

The selector unit is operated from a usual power line of 115 volts and 60 cycles, as by way of a cable 53. This cable 53 is connected through a stepdown transformer 56 to a full-wave rectifier 57. This rectifier has output terminals 58 and 59 marked + and − respectively, across which about 48 volts of direct current are made available. The negative terminal 59 is connected to a bus line 60 having many connections to different parts of the selector circuit, and may be herein referred to as B− of the system. The positive terminal 58, which may be referred to as B+, has initially a circuit connection to B− through the coil of an "activating" relay 61 for the selector unit via contacts 1 and 2 of any of respective "busy machine" relays for the attendants' stations, referred to by the number 63 with the suffix letter of the respective station, and contacts 1 and 2 of any of manual disabling switches for the respective attendants' stations, referred to by the number 64 with the suffix letter of the respective station. Since in the present description we are considering the operation of the selector unit in completing a connection from station 10*a* to attendant's station 12*m*, we may consider the circuit of activating relay 61 as being completed through contacts 1 and 2 of busy machine relay 63*m* (now in unoperated position but moved to operated position when the respective machine is activated) and contacts 1 and 2 of disabling switch 64*m*. As the activating relay 61 operates, positive terminal 58 is connected by contacts 1 and 2 of this relay to a bus line 66 which has many connections to different parts of the selector circuit and which becomes the B+ line of the selector unit. As will appear later, the manual switch 64*m* for station 12*m* is provided to enable the selector apparatus for that station to be disabled, as for servicing or repair, without disabling the selector apparatus for the other attendants' stations.

Further direct functions resulting from operation of the activating relay 61 are to make power available to an auxiliary selector relay 67 of the machine selector R through contacts 4 and 5 of activating relay 61, but without any immediate effect on that relay as will appear, and to disconnect a transformer 69 from the A.-C. power source by opening of contacts 6 and 7 of the activating relay 61.

Consider next that the machine selector R is in its "*m*" position for selecting the idle machine of station 12*m*, as shown in Figure 2, and that the operator at remote station 10*a* calls for an idle machine by lifting his handset from its support, it being considered further for instance that none of the other operators at remote stations 10*b*, 10*c*, etc. are at the present time using any machine of the system, in which case their handsets will be resting on their respective supports. As the station switch 44 of station 10*a* is closed, a circuit is completed through leads 15*f* and 15*g* of cable 13*a* and the resistor 47 of station 10*a* from the B+ and B− terminals aforementioned to cause a respective line marker relay 71*a* for station 10*a* to be operated. As this relay is operated, contacts 1 and 2 thereof open to disconnect a bus line 73*a* from B+ for the purposes hereinafter described, and contacts 1 and 3 thereof close to cause a "search initiator" relay 74 to be connected across B+ and B−.

As the search initiator relay 74 is operated, contacts 1 and 2 thereof open to disconnect a bus line 76 from B− (for purposes of preventing any line finder switches returning to home position while any other line finder switch is being moved from home position in a searching operation, as will appear), and contacts 1 and 3 thereof close to cause operation of a "line finder stop" relay 77 through a circuit across B+ and B− including lead 78, contacts 1 and 3 of relay 74, lead 79, contacts 1 and 2 of a relay 81, coil of relay 77, contacts 1 and 2 of a "machine initiator" relay 83, lead 84, pole 85 and contact 85*m* of machine selector R, lead 86*m*, pole 87*m* and home contact 87*o* of line finder $R_m$, lead 88*m*, contact 89*m* and pole 89 of machine selector R, lead 90, contacts 4 and 5 of search initiator relay 74, lead 92, and contacts 1 and 3 of line marker relay 71*a*.

Operation of line finder stop relay 77 closes contacts 1 and 2 thereof to connect a "memory" relay 93 across B+ and B− through contacts 1 and 2 of a memory release relay 94. As memory relay 93 operates, it is locked in by closure of its holding contacts 1 and 2. Also, as this relay operates, contacts 4 and 5 thereof are closed to cause operation of "auxiliary" relay 95*m* of line finder $R_m$ through a search circuit across B− and B+ including contacts 3 and 4 of relay 77, contacts 4 and 5 of relay 93, pole 96 and contact 96*m* of machine selector R, lead 97*m*, contacts 1 and 2 of operating relay 98*m* of line finder $R_m$, coil of auxiliary relay 95*m*, pole 87m and contact 87*o* of line finder $R_m$, lead 88*m*, contact 89*m* and pole 89 of machine selector R, lead 90, contacts 4 and 5 of relay 74, lead 92, and contacts 1 and 3 of relay 71*a*.

As the auxiliary relay 95*m* operates, contacts 1 and 2 thereof close to cause operating relay 98*m* of line finder $R_m$ to operate and to load a stepping spring not shown but well understood in stepping switches. Also, this relay opens contacts 1 and 2 thereof to deenergize the auxiliary relay 95*m*. Contacts 1 and 2 of relay 95*m* therefore open to deenergize operating line finder relay 98*m* wherefore to cause the stepping spring to advance all poles of line finder $R_m$ by one step, say in a clockwise direction as indicated. This procedure repeats, if necessary, until the pole 87*m* contacts an open line. Note that initially the pole 87*m* is connected to B+ through homing contact 87*o*, lead 88*m*, pole 89 and contact 89*m* of machine selector R, contacts 4 and 5 of relay 74 and contacts 1 and 3 of relay 71*a*; that the remaining inactive contacts of pole 87*m* are jumpered together and connected by a lead 100 direct to B+; and that contacts 87*c* and 87*b* are connected by contacts 1 and 2 of respective relays 71*c* and 71*b* for respective remote stations 10*c* and 10*b*, the same as relay 71*a* is provided for remote station 10*a*, to B+. Thus, line finder $R_m$ will advance clockwise to contact 87*a* leading to the aforementioned bus line 73*a*, since this bus line is now open by reason of relay 71*a* being in operated position, and will come to rest in its "*a*" position.

As soon as the pole 87*m* of line finder $R_m$ comes to its open "*a*" position, power is lost to the line finder stop relay 77 causing it to return to unoperated position. Although contacts 1 and 2 of relay 77 are now opened, relay 93 stays operated because of its holding contacts 1 and 2 paralleling contacts 1 and 2 of relay 77. Closure of contacts 3 and 5 of relay 77 causes operation of machine initiator relay 83 through holding contacts 1 and 2 of memory relay 93. Contacts 4 and 5 of machine initiator relay 83 now close to connect the resistor 101 across the audio circuit of the machine of station 12*m* through poles 102 and 103 and respective contacts 102*m* and 103*m* of machine selector R, and 2-wire cable 104*m* to leads 16*f* and 16*g* of cable 14*m*. Connection of this resistor across the audio circuit of the machine has the same effect as the connection of station resistor 47 thereacross to cause machine activating relay 32 to operate as before described; and in response thereto signaling current is fed through transformer 39 to leads 16*h* and 16*i* of cable 14*m*. As shown in Figure 2, the latter leads connect in the selector unit across the busy machine relay 63*m* through rectifier 105, causing this relay to operate. Lead 16*i* of cable 14*m* is also connected through rectifier 105 to pole 106*m* of line finder $R_m$, and lead 16*h* of this cable is connectable through contacts 6 and 7 of relay 63*m* to pole 107*m* of line finder $R_m$. These poles 106*m* and 107*m* are connected now to contacts 106*a* and 107*a* respectively, in view of the line finder $R_m$ having been advanced to its "*a*" position as before explained. Contacts **106*a* and 107*a* are connected by leads 108 and 109 to a "line transfer" relay 110*a* associated with the remote station 10*a*. Since the relay 63*m* is already operated by signal power from station 12*m*, causing its contacts 6 and 7 to be closed, this signal power is carried on to transfer relay 110*a***, causing it to operate.

As the transfer relay **110*a* is operated, contacts 1 and 2 and contacts 4 and 5 break to disconnect the branch communication circuit of station 10*a*, represented by leads 15*f* and 15*g* of cable 13*a*, from across B+ and B− through relay 71*a*, causing relay 71*a* to return to unoperated position; and immediately thereafter contacts 1 and 3 and contacts 4 and 6 of transfer relay 110*a* close to connect the branch communication circuit of station 10*a* to a pair of leads 111*a* and 112*a* which connect respectively to contacts 113*a* and 114*a* associated respectively with poles 113*m* and 114*m* of line finder $R_m$. Pole 113*m* is connected directly to audio lead 16*f* of cable 14*m* leading to attendant's station 12*m*, and pole 114*m* is connected through contacts 8 and 9 of relay 63*m*, which are now closed because of this relay being operated as before explained, to audio lead 16*g* of cable 14*m*. Since poles 113*m* and 114*m* now register with their contacts 113*a* and 114*a*** in view of line finder $R_m$ being in its "*a*" position, a result of the operation of transfer relay **110*a* is to shift the audio circuit of the remote station 10*a* from the D.-C. power supply through relay 71*a* to the audio circuit 28 of the phonographic machine of station 12*m* while maintaining the activating relay 32 of that machine in operated position. Likewise, the signal circuit from station 10*a*, represented by the leads 15*h* and 15*i* of cable 13*a*, is now connected to leads 109 and 108 by contacts 7 and 9 and contacts 10 and 12 respectively of the line transfer relay 110*a*. As before explained, leads 108 and 109 are now connected to poles 106*m* and 107*m* respectively of line finder $R_m$, which in turn are connected to leads 16*h* and 16*i* of cable 14*m* of the attendant's station 12*m*. Thus, a through connection is also made for the signaling current from station 12*m* to the signal light 50 of the remote station 10*a***.

The disconnection of relay **71*a* from station 10*a* above explained, causes contacts 1 and 2 thereof to close and connect B+ through lead 73*a* to contact 87*a* of line finder $R_m$. This connection of contact 87*a* to B+, which before caused operation of the line finder $R_m$, is now prevented from operating this line finder because both circuits of relay 95*m* to B− are now broken (1) by contacts 4 and 5 of relay 63*m* being open, and (2) by contacts 3 and 4 of relay 77 being open. The connection of contact 87*a* of line finder $R_m$ to B+ does however complete the circuit of the memory release relay 94 through pole 87*m*, lead 86*m*, contact 85*m* and pole 85 of machine selector R, contacts 1 and 3 of initiator relay 83 and coil of relay 94 to B−. Operation of this relay breaks contacts 1 and 2 thereof to cause memory relay 93 to return to unoperated position. Note that the bus line 73*a* for station 10*a*** is connected to the "*a*" contacts of all the line finders $R_m$, $R_n$, etc. A benefit, therefore, of having bus line **73*a* connected to B+ is that if the line finder for any other attendant's station, say the line finder $R_n$ for attendant's station 12*n***, comes to its "*a*" position, it will find power there to prevent the line finder from coming to rest at that position now occupied by line finder $R_m$. The return of relay 93 to unoperated position, in the sequence of operations above described, causes its contacts 1 and 2 to open wherefore to cause initiator relay 83 to return also to unoperated position. Contacts 4 and 5 of relay 83 therefore open to disconnect resistor 101 from the audio circuit of the machine of station **12*m*, and contacts 1 and 3 thereof open to cause relay 94 to return to unoperated position. Thus relays 83, 93 and 94** are now all returned to unoperated positions.

A further function of the return of line marker relay **71*a* to unoperated position, which occurs as the line transfer relay is operated, is to remove power from the relay 74 to cause it to return likewise to unoperated position. This causes the bus line 76 to be reconnected to B−. As will appear, the connections by which the line finders $R_m$, $R_n$, etc. are advanced onwardly to home or zero positions are via homing circuits through respective lead 97 to junction 97*o*, contacts 4 and 5 of respective busy relay 63, bus 76 and contacts 1 and 2 of relay 74. Since the relay 74** is operated when the line finder is called on to make a search in response to a remote operator's lifting his handset, and is not returned until that search is completed, it follows that if another operator should hang up his handset while a search is going on, the return of his respective line finder to home position is held up until that search is completed as is hereinafter more fully described.

As the relay **63*m* is operated, incidental to the completion of a through connection of station 10*a* to station 14*m* as before explained, the contacts 1 and 3 close to complete the circuit of auxiliary relay 67 of machine selector R through pole 115 and associated contact 115*m* of this selector R, lead 116*m*, contacts 1 and 3 of relay 63*m*, and switch 64*m* to B−. Relay 67 operates in conjunction with operating relay 117 of machine selector R. For example, operation of relay 67 closes contacts 1 and 2 to complete the circuit of relay 117 through contacts 10 and 11 of memory relay 93. Operation of relay 117 loads the driving spring (not shown) for machine selector R and opens contacts 1 and 2 to deenergize relay 67 and cause release of the driving spring, wherefore to cause the machine selector to advance by one step, say in a clockwise direction. This procedure repeats until pole 115** finds an open circuit. Such open circuit is found when the pole comes to a contact representing a machine not in use. When the machine selector comes to position "*n*," power is lost to relay 67 to cause the selector to remain in that position. On the other hand, if the machine of station **12*n* has been put out of service by operating the disabling switch 64*n*, the contacts 1 and 3 of this disabling switch will be closed to cause contact 115*n* to be connected to B− via lead 116*n***. The machine selector R will therefore move onwardly past its "*n*" position. Thus, the machine selector R always comes to rest at a position representing an available machine before that machine is called for by a remote operator. Since only two machines are shown in the present illustrative embodiment, all contacts associated with pole 115, except the "*m*" and "*n*" contacts, are interconnected by jumpers and provided with one common lead connection 119 to B−. After selection of station $R_n$ is made, the machine selector will step ahead through its inactive contacts and come to rest again at its "*m*" position provided the machine at station **12*m*** is now idle.

From the foregoing description it will be apparent that the operation of the selector unit is briefly as follows: When an operator picks up his handset, the relays 71, 74, 77 and 93 are operated in sequence. This causes activation of the line finder relay 95 for the line-finder stepping switch corresponding to the machine preselected by the machine selector stepping switch R. The relays 95 and 98 then operate alternately to step the line finder ahead until it reaches the position corresponding to the station of the calling operator. The relay 77 is then returned to unoperated position, causing the machine initiator relay 83 to operate. This relay 83 connects the resistor 101 across the audio circuit of the preselected machine to cause the machine to be activated. Signal current is then fed from the activated machine to operate the respective "busy" relay 63 and to operate the line transfer relay 110 corresponding to the station of the calling operator. The relays 110 and 63 start respective operations, to wit: (1) operation of relay 110 releases relay 71 to cause relay 94 to operate and this in turn causes release of relays 93, 83, 94 and 74 in sequence; and (2) operation of relay 63 causes the auxiliary selector relay 67 of the machine selector R to operate, and upon release of the relay 93 in the aforestated sequence, operation of relay 67 causes the selector relay 117 to operate. The relays 67 and 117 then operate alternately to step the machine selector ahead until it comes to a position corresponding to another idle machine. During this automatic selection, the relay 81 is operated to prevent operation of the line-finder stepping switches during machine selection.

The feature, hereinbefore described, of stopping the homing of any of the line finders while another is making a search is important in preventing the paralleling of machines with any one remote station. For instance, in the sequence of relay operations in causing a line finder to make a search in response to a calling station, the relay 71 corresponding to that calling station is first operated and remains operated until the search is completed. Operation of this relay causes power to be removed from the contacts of all line finders corresponding to that calling station. If another line finder were permitted to move onwardly to home position during this interval that the relay 71 is operated, and should have to pass the position corresponding to that calling station in its homing operation, it would be stopped at that position because of power being there unavailable. By way of specific example, assume station **10*b* is calling and line finder $R_n$ is responding to that call. Assume also that in the interval that the line marker relay 71*b*** is operated, the line finder $R_m$ is homing from its "*a*" position. When line finder $R_m$ reaches its "*b*" position it comes to rest because the operation of relay **71*b*** has removed power from all "*b*" positions for the poles 87 of the line finders. Line finder $R_m$ stops therefore at "*b*" position in its homing operation. For the same reason, line finder $R_n$, in its searching operation, comes to rest at its "*b*" position. When the line finder $R_n$ reaches its "*b*" position the transfer relay **110*b* is operated to cause station 10*b* to be connected to the machine of station 12*n***. Since the line finder $R_m$ is now also in its "*b*" position, the station **10*b* would also become connected to the machine of station 12*m*** in the manner described in the following paragraph.

When the machine at station **12*n* is activated a voltage appears between the positive terminal of the power pack 55 of this station and the lead 111*b*—which is the voltage drop across the relays 32 and 33, the transformer 29 and the lead 16*f* of station 12*n*. This voltage drop causes a current to flow through the coil of the relay 32 of the station 12*m* via the following path: from plus terminal of power pack 55 of station 12*n* through relay 31, lead 51 and lead 16*h* of station 12*n*, relay 63*n*, pole 106*n*** and the "*b*" contact of line finder $R_n$, the "*b*" contact and pole **106*m* of line finder $R_m$, lead 16*i*, secondary of transformer 39, lead 51, relays 31, 32 and 33, primary of transformer 29 and lead 16*f* all of station 12*m*, and pole 113*m*** and associated "*b*" contact of line finder $R_n$ back to lead **111*b*. The current flow in the coil of relay 32 of station 12*m* is sufficient to operate this relay to cause activation of the machine of station 12*m* in the manner before described. As transformer 39 of station 12*m* is energized a voltage appears on the leads 16*h* and 16*i* of this station and across the coil of relay 63*m*. The resultant current flow through the coil of relay 63*m* will cause the contacts 6—7 and 8—9 to be closed. This will cause the remote station 10*b* to be also connected to the machine of station 12*m*** in the manner hereinbefore described. Thus unless homing of the line finders is prevented while another line finder is making a search, two or more machines could become connected in parallel with one of the remote stations.

At the start of each step advance of the machine selector R, the contacts 3 and 4 of the relay 67 close to connect the relay 81 across B+ and B—. Contacts 1 and

2 of the relay 81 then open to prevent operation of the line finder stop relay 77. Although the contacts 3 and 4 of relay 67 are opened intermittently as the selector R steps ahead, the relay 81 is of a slow-release type to cause it to be maintained in operated position until the selector R comes to rest at a position corresponding to an available machine. Thus, the line finder stop relay 77 is maintained in unoperated position during the time that the machine selector R is in operation. The effect of maintaining the relay 77 unoperated is to interrupt the sequence of relay operations required to start one of the line finders moving from home position to make a search for a calling station. If it were possible to start a line finder search, in response to a calling operator lifting his handset while the machine selector R is in operation, then when the relay 93 is operated (in the sequence of relay operations required to start such line finder search) the contacts 10 and 12 thereof would open to disable the relay 117 and stop the machine selector R. This could cause either of two types of misoperation of the selector mechanism, depending upon whether the selector R is at a vacant position or at an active position representing a busy machine, at the time the selector is stopped.

If the selector R were at a vacant position when the relay 93 is operated, it would next move from that position only when the relay 93 is subsequently released. The relay 93 can be released only upon operation of relay 94. However, the relay 94 cannot now be operated because its energizing circuit is through the pole 85 of the selector R and this pole now stands at a vacant contact. Only a momentary interruption in the power supply to the selector unit would release the relay 93 to restore operation of the selector R.

On the other hand, if the selector R were at an active position representing a busy machine at the time the relay 93 were operated in the sequence of starting a line finder search, power would be supplied at that instant to the operating relay of the line finder corresponding to that selector position. This is because the contact which makes with the pole 87 of the line finder corresponding to a busy machine is connected to B+ after a search has been completed. For example, if the line finder $R_n$ were operated and at position "*b*," and the selector R were at "*n*" position as just assumed and if, as assumed, a line finder search were initiated by the operator of station **10*a* picking up his handset and causing the relay 93 to be operated, an energizing circuit for the relay 95*n* of the operated line finder $R_n$ would be completed from B— through contacts 3 and 4 of relay 77, contacts 4 and 5 of relay 93, pole 96 and contact 96*n* of selector R, lead 97*n*, contacts 1 and 2 of relay 98*n*, coil of relay 95*n*, pole 87*n* and contact 87*b* of line finder $R_n$, lead 73*b*, and contacts 1 and 2 of relay 71*b* to B+. This would energize the relay 95*n*, which in turn would energize the relay 98*n* to step the line finder $R_n$ ahead and cause the machine previously connected to station 10*b*** to be disconnected from that station.

By providing the aforementioned safety relay 81 to open the circuit of the line finder stop relay 77 while the selector R is in operation, both of the possible misoperations described in the two foregoing paragraphs are circumvented.

If all of the machines are in use; that is, in the present instance, if the machines of both stations **12*m* and 12*n* are in use, or if these stations are removed from service by operation of the respective disabling switches 64, each parallel circuit for the activating relay 61 through contacts 1 and 2 of the respective busy relays 63 and disabling switches 64 will be interrupted to cause the relay 61 to return to unoperated position. As the contacts 1 and 2** of the activating relay open, operating power is removed from the selector unit to cause all components thereof to remain at standstill until a machine again becomes available.

As the activating relay 61 is returned to unoperated position, the contacts 1 and 3 thereof are closed to supply a busy tone from the rectifier 57 through condenser 121, lead 122, B+ line 66, condensers 123 with suffix letters of respective remote stations which shunt relays 71, to all audio circuits of the remote stations except those in use. Also, contacts 6 and 7 of relay 61 close to connect transformer 69 across the A.-C. power supply to cause signal current to be fed through line 124 leading to contacts 8 and 11 of line transfer relay 110 of the respective remote stations. As to all stations not in use, the 8 and 11 contacts are connected to leads 15*h* and 15*i* of the cables from the remote stations to cause the busy lamps to light. All of these busy signals are removed as soon as any one machine is released for then the respective relay 63 will return to unoperated position to cause operation of activating relay 61, with subsequent sequential operation of the machine selector R to a position corresponding to that idle machine.

When connection of a remote station is made to the last one of the available machines, the respective busy relay 63 will operate and will open the last of the energizing circuits for the activating relay 61 which are made via the contacts 1 and 2 of the busy relays. Since each busy relay 63 operates before the line transfer relay 110, and the transfer relay must operate to complete the circuit connection between the calling station and the machine, the activating relay 61 would be released and power would be lost to the entire selector unit before the interstation connection is completed. However, since the memory relay 93 is not released until after the transfer relay 110 is operated, an energizing circuit for the activating relay is maintained until after the transfer relay is operated via line 125 and contacts 7 and 8 of the memory relay 93.

It will be noted from the foregoing description that if either of the manual disabling switches 64*m* or 64*n* is operated to close contacts 1 and 3 thereof, the respective contact 115*m* or 115*n* of the machine selector R is thereby connected to B− to move from that position. This assures non-selection of that machine while it is under service or repair.

Note also, that the signal lamps 120*m* and 120*n* are connected across the signal circuits 16*h* and 16*i* of the stations 12*m* and 12*n* to indicate at the selector unit which of the machines are in use. This signal lamp will warn a serviceman against operating a disabling switch 64 while a respective machine is in use.

When the handset at station 10*a* is hung up while that station is connected, for example, to station 12*m*, the respective station switch 44 is opened to cause the following operations to occur: the machine activating relay 32 of station 12*m* is returned to unoperated position causing, after a delay of about 5 seconds, the switch 65 to open and to remove signal power from the selector unit. The busy relay 63*m* for this station then returns to unoperated position. Contacts 6 and 7 of this relay open to break the energizing circuit of the transfer relay 110*a*, causing it to return to unoperated position. Contacts 4 and 5 of relay 63*m* close, causing operation of auxiliary line finder relay 95*m* through a homing circuit from B+ to B− including contacts 1 and 2 of relay 71*a*, contact 87*a* and pole 87 of line finder $R_m$, coil of relay 95*m*, contacts 1 and 2 of relay 98*m*, contacts 4 and 5 of relay 63*m*, bus line 76 and contacts 1 and 2 of relay 74. As the relay 95*m* is operated contacts 1 and 2 thereof close to cause relay 98 to operate, etc., as before explained, until the line finder $R_m$ is returned to home position whereat its pole 87 makes with its contact 87*o* normally disconnected from B+.

The embodiment of my invention herein particularly described is intended to be illustrative and not limitative of my invention since my invention has many possible applications in other fields than in the phonograph field herein described and since my invention is subject to many changes and modifications without departure from the scope thereof, which I endeavor to express according to the following claims.

I claim:

1. In an electrical system including first and second series of stations each having dual circuits leading therefrom, each of said first series of stations having circuit-closing means in one of its said circuits and a load device in the other of its said circuits, and each of said second series of stations having a power source connected to one of its said circuits and electrically-energizable means in said one circuit and having means in its other circuit controlled by said electrically-energizable means and effective upon closure of said one circuit to cause energization of said other circuit whereby to activate the station: a dual circuit selector mechanism for interconnecting stations of said first and second series independently of each other comprising line finder switches for stations of said second series respectively, each having positions corresponding respectively to the stations of said first series; a station selector switch having positions corresponding respectively to the stations of said second series and set initially to a position corresponding to an unactivated station of said second series; respective means for advancing said line finder and selector switches step by step; means effective upon closure of the said one circuit of one of the stations of said first series for energizing via said station selector switch the advancing means for the one line finder switch corresponding to the positioning of said station selector switch, including means to cause said one line finder switch to stop at the one position thereof corresponding to said one station of said first series; means rendered operative by said one line finder switch as the same reaches said one position for closing the said one circuit of said unactivated station to cause energization of the said other circuit thereof thereby activating said station; electrically-operable line transfer means for the stations of said first series respectively; means for connecting the one line transfer means corresponding to said one station of said first series via said one line finder switch to cause operation of said one line transfer means as said other circuit is energized; and means rendered effective by said one line transfer means upon operation thereof while said one line finder switch is in its said one position for connecting the first and second circuits of said one station to the first and second circuits respectively of said activated station.

2. The combination set forth in claim 1 including respective busy relays for said second stations operated respectively as said second stations are activated; and means effective upon operation of one of said busy relays for causing said station selector switch to be advanced to a position corresponding to an unactivated station of said second series.

3. In an electrical system including first and second series of stations each having dual circuits leading therefrom, each of said first series of stations having circuit-closing means in one of its said circuits and a load device in the other of its said circuits, and each of said second series of stations having a power source connected to one of its said circuits and electrically-energizable means in said one circuit and having means in its other circuit controlled by said electrically-energizable means and effective upon closure of said one circuit to cause energization of said other circuit whereby to activate the station: a dual circuit selector mechanism connected to said circuits of said stations and adapted for interconnecting stations of said first and second series independently of each other, comprising a power source for said selector mechanism; multiple circuit line finder switches for stations of said second series respectively, each having positions corresponding respectively to the stations of said first series; a multiple circuit station selector switch having positions corresponding respectively to the stations of said second series and set initially to a position corresponding to an unactivated one of said second stations; respective means for advancing said line finder and selector switches step by step; means operable by said power source of said selector mechanism upon closure of said one circuit of a selected one of the stations of said first series for supplying operating current via said station selector switch to the advancing means of the one line finder switch corresponding to the positioning of said station selector switch; means for stopping said one line finder switch when the same reaches one position thereof corresponding to said one station of said first series; means rendered operative by said one line finder switch as the same reaches said one position for closing said one circuit of said unactivated station to cause energization of said other circuit thereof thereby activating said station; respective electrically-operable line transfer means for the stations of said first series; means supplying operating current via said one line finder switch to the one transfer means corresponding to said one station of said first series upon energization of said second circuit of said activated station; and circuit means connected via said one line transfer means when the same is in operated position and via said one line finder switch when the latter is in said one position for connecting the first and second circuits of said one station to the first and second circuits respectively of said activated station.

4. In an electrical system including first and second series of stations each having dual circuits leading therefrom, each of said first series of stations having circuit-closing means in one of its said circuits and a load device in the other of its said circuits, and each of said second series of stations having a power source connected to one of its said circuits and electrically-energizable means in said one circuit and having means in its other circuit controlled by said electrically-energizable means and effective upon closure of said one circuit to cause energization of said other circuit whereby to activate the station: a dual circuit selector mechanism for inter-connecting stations of said first and second series independently of each other comprising a power source for said selector mechanism; electrically-operated devices for automatically connecting any selected one of said first series of stations to an unactivated one of said second series of stations as the circuit-closing means of said one station of said first series is operated; an activating relay for said selector mechanism means controlled by said activating relay and effective when the activating relay is in operated position to supply operating current to render said operating devices operable; an energizing circuit for said activating relay; respective relays for the stations of said second series including switches connected in parallel in said energizing circuit, said switches being closed when the relays are unoperated; and means for each of said relays effective upon activation of the respective station for causing the relay to operate whereby upon activation of all of said second stations said energizing circuit is held open to cause said activating relay to be unoperated.

5. The combination set forth in claim 4 including disabling switches for said second stations respectively, connected in parallel with each other in said energizing circuit of said activating relay, said disabling switches being normally closed with respect to said energizing circuit and being movable to operated positions; and means controlled by said disabling switches according to which of said disabling switches are moved to operated positions for disabling said selector mechanism as to the respective ones of said second stations.

6. The combination set forth in claim 4 including an all-busy signaling means for said first stations; respective control means for connecting said all-busy signaling means to those of said first stations not connected to any of said second stations; and switch means controlled by said selector-mechanism activating relay and effective when the latter is unoperated to render said all-busy signaling means operative.

7. In an electrical system including first and second series of stations having respective circuits leading therefrom, each of said first stations having circuit-closing means in one of its said circuits: a multiple-circuit selector mechanism responsive to closure of said one circuit of any selected one of said first stations for effecting an independent connection automatically from said one station to an idle station of said second series, comprising a power source for said selector mechanism; respective line marker relays for said first stations; means effective on closure of the circuit of a calling station of said first series to cause operation of the respective line marker relay by said power source; respective line finder stepping switches for the stations of said second series, each having positions corresponding respectively to the stations of said first series including also a home position; means responsive to operation of said respective line marker relay for operating one of said line finder stepping switches, corresponding to an idle second station, from its said home position to a position corresponding to that of said calling station; respective line transfer relays for said first stations; means responsive to said operation of said line finder stepping switch for operating the one line transfer relay corresponding to said calling station; and means responsive to operation of said one line transfer relay for causing return of the respective line marker relay to unoperated position and for connecting said calling station to said idle station via said one line finder stepping switch.

8. The combination set forth in claim 7 including means rendered operative by said respective line marker relay upon return thereof to unoperated position for rendering all remaining line finder stepping switches inoperative to come to rest at positions corresponding to said calling station.

9. The combination set forth in claim 7 including an all-busy signaling means for said first stations; means to cause said signaling means to be operative when all of said second stations are in use; and means controlled by said transfer relays for connecting said signaling means to all idle ones of said first stations.

10. The combination set forth in claim 7 including a selector stepping switch having positions for said second stations respectively; means controlled by said selector switch to cause said line finder stepping switches to be selected for operation according to the positioning of said selector stepping switch; and means rendered operative by said selected line finder switch as the same reaches a position corresponding to said calling station to cause operation of said selector stepping switch a new position corresponding to an idle second station.

11. The combination set forth in claim 10 including disabling means for rendering said line finder stepping switches inoperative to move from home position; and means controlled by said selector stepping switch for rendering said disabling means effective while said selector stepping switch is in operation.

12. In an electrical system including a first series of stations and a second station each having respective circuits leading therefrom, each of said first stations having circuit-closing means therein: a multiple-circuit selector mechanism for effecting an independent connection from a station of said first series, upon closure of the said circuit thereof, to said second station, comprising a power source; respective line marker relays for said first stations; a line finder stepping switch for said second station having a position for each of said first stations; respective line transfer relays for said first stations, each normally positioned to connect the respective line marker relay and said power source in series with the circuit of the respective first station whereby upon operation of the respective circuit-closing means of said first station the respective line marker relay is operated; means rendered effective upon operation of one of said line marker relays for causing said line finder switch to step ahead to the one position thereof corresponding to the respective calling station; means responsive to said positioning of said line finder switch for operating the one transfer relay corresponding to said calling station; and circuit means rendered effective when said one transfer relay is operated and said line finder switch is in said one position for connecting the circuit of said calling station to said second station.

13. In an electrical system including first and second series of stations having circuits leading therefrom, each of said first stations having circuit-closing means therein: a multiple-circuit selector mechanism for effecting an independent connection from a selected station of said first series, upon closure of the said circuit thereof, to an idle station of said second series, comprising a power source; respective line finder stepping switches for said second stations each having a position for each of said first stations and a home position, and including means to advance the switch step by step from home position to make a search and to return the switch to home position; a searching circuit and a homing circuit for each of said line finder stepping switches; means for selecting the line finder corresponding to said idle second station; means rendered operative upon closure of the circuit of one of said first stations to render operative said searching circuit of the respective line finder stepping switch to cause step by step advance of said respective stepping switch from home position; means for causing said respective stepping switch to come to rest at a position corresponding to said selected one station; means responsive to said respective stepping switch reaching said corresponding position to cause a connection to be completed between said selected one station and said idle station; means to cause all of said homing circuits to be disabled while said selected line finder stepping switch is making a search; and means operative upon opening of said circuit of said selected one station to render operative said homing circuit of said respective stepping switch to cause return thereof to home position.

14. In an electrical system including first and second series of stations each having dual circuits leading therefrom, each of said first series of stations having circuit-closing means in one of its said circuits and a load device in the other of its said circuits, and each of said second series of stations having a power source connected to one of its said circuits and electrically-energizable means in said one circuit and having means in its other circuit controlled by said electrically-energizable means and effective upon clousure of said one circuit to cause energization of said other circuit whereby to activate the station; a dual circuit selector mechanism for interconnecting stations of said first and second series independently of each other comprising means effective upon closure of said one circuit of one of the stations of said first series for closing the said one circuit of a selected unactivated station of said second series whereby to cause energization of said other circuit thereof to activate said selected station; electrically-operable line transfer means for the stations of said first series respectively; means responsive to energization of said other circuit of said selected station to cause operation of the line transfer means corresponding to the said one station of said first series; and means rendered effective by said one line transfer means upon operation thereof for connecting the first and second circuits of said one station to the first and second circuits respectively of said selected station.

References Cited in the file of this patent

UNITED STATES PATENTS

| | | |
|---|---|---|
| 1,588,437 | Bailey | June 15, 1926 |
| 1,924,661 | Stehlik | Aug. 29, 1933 |
| 2,066,672 | De Berard et al. | Jan. 5, 1937 |
| 2,133,415 | Baker et al. | Oct. 18, 1938 |
| 2,384,775 | Stenhammer | Sept. 11, 1945 |

UNITED STATES PATENT OFFICE

CERTIFICATE OF CORRECTION

Patent No. 2,755,339 July 17, 1956

William W. Logan

It is hereby certified that error appears in the printed specification of the above numbered patent requiring correction and that the said Letters Patent should read as corrected below.

Column 2, line 50, for "aimplifier" read -- amplifier --; column 13, line 44, after "mechanism" insert -- ; --; column 14, line 48, after "switch" insert -- to --.

Signed and sealed this 4th day of April 1961.

(SEAL)

Attest: ERNEST W. SWIDER

~~KARL H. AXLINE~~

Attesting Officer

ARTHUR W. CROCKER

Acting Commissioner of Patents